US010171893B2

(12) United States Patent
Tan et al.

(10) Patent No.: US 10,171,893 B2
(45) Date of Patent: Jan. 1, 2019

(54) BATTERY-POWERED WIRELESS LONG LIFE TEMPERATURE AND HUMIDITY SENSOR MODULE

(71) Applicant: Archimedes Controls Corp., Pleasanton, CA (US)

(72) Inventors: Liangcai Tan, Dublin, CA (US); Wenli Yu, Pleasanton, CA (US); Xin Hu, Dublin, CA (US)

(73) Assignee: Archimedes Controls Corp., Pleasanton, CA (US)

( * ) Notice: Subject to any disclaimer, the term of this patent is extended or adjusted under 35 U.S.C. 154(b) by 0 days.

(21) Appl. No.: 15/382,017

(22) Filed: Dec. 16, 2016

(65) Prior Publication Data

US 2017/0188121 A1    Jun. 29, 2017

Related U.S. Application Data

(60) Provisional application No. 62/269,902, filed on Dec. 18, 2015.

(51) Int. Cl.
*G01J 1/02* (2006.01)
*H04Q 9/00* (2006.01)

(52) U.S. Cl.
CPC ........... *H04Q 9/00* (2013.01); *H04Q 2209/40* (2013.01); *H04Q 2209/823* (2013.01); *H04Q 2209/84* (2013.01); *H04Q 2209/88* (2013.01)

(58) Field of Classification Search
CPC ....................................................... H04Q 9/00
USPC ................... 340/870.17, 5.1, 10.5
See application file for complete search history.

(56) References Cited

U.S. PATENT DOCUMENTS

| | | | |
|---|---|---|---|
| 8,760,293 B2 * | 6/2014 | Steiner | G01J 1/02 250/205 |
| 2011/0092164 A1 * | 4/2011 | Spanhake | H04Q 9/00 455/67.11 |
| 2013/0278377 A1 * | 10/2013 | Slupsky | G01L 321/32 340/5.1 |
| 2014/0002239 A1 * | 1/2014 | Rayner | G08B 13/1427 340/5.61 |
| 2014/0062669 A1 * | 3/2014 | Mena | G06F 17/40 340/10.5 |
| 2017/0013069 A1 * | 1/2017 | Grohman | H04L 67/22 |
| 2017/0176033 A1 | 6/2017 | Tan et al. | |
| 2017/0176039 A1 | 6/2017 | Liu et al. | |
| 2017/0177762 A1 | 6/2017 | Liu et al. | |
| 2017/0180913 A1 | 6/2017 | Tan et al. | |

* cited by examiner

*Primary Examiner* — Albert K Wong
(74) *Attorney, Agent, or Firm* — Morrison & Foerster LLP

(57) ABSTRACT

An adaptive algorithm based battery-powered long distance wireless temperature and humidity sensor module. The sensor module uses an adaptive algorithm to transmit data on an event basis and/or a reduced basis to extend battery life to more than 10 years. It also uses a low power wireless transmitter which has frequency of sub-1 GHz and an effective transfer distance of up to 250 meters, a low power temperature and humidity sensor, and a long lasting lithium battery which has shelf life of 20 years.

7 Claims, 3 Drawing Sheets

BATTERY-POWERED WIRELESS LONG LIFE TEMPERATURE AND HUMIDITY SENSOR MODULE

CROSS-REFERENCE TO RELATED APPLICATION

This application claims the benefit of U.S. Provisional Application No. 62/269,902, filed on Dec. 18, 2015, the entire contents of which are incorporated herein by reference.

FIELD OF THE INVENTION

The present invention relates to sensors and measurement and, more particularly, to wireless air temperature and relative humidity sensors.

BACKGROUND OF THE INVENTION

Air temperature and humidity measurement is essential for environmental monitoring and energy management system in mission critical facilities. These systems usually need large amount of sensors in real time measurement. There are two types of sensors for these systems, wired or wireless. Conventional sensors are wired, which rely on physical wires to provide continuous power supply and transmit data to the data acquisition system. However, wired sensors and systems take a long time for installation and their reliability is dependent on a power supply. There are a small number of battery powered wireless temperature and humidity sensors in the market. They utilize wireless technologies like WIFI, ZigBee or sub-1 G MHz systems to transmit data. These wireless sensors have relatively short transmission distances, from 20 meters to 100 meters at open space. Their battery life is also typically short from 1 to 5 years. Although there are a couple of products that claim that their battery life is more than 10 years, these sensors are bulky and their transmission distance is short.

SUMMARY OF THE INVENTION

Described are battery-powered long distance wireless temperature and humidity sensor modules. These sensors include an adaptive algorithm that manages the power requirements of the sensor. In some embodiments, this sensor module has a long life of more than 5 years, more than 10 years, or more than 15 years without the need for battery replacement. The sensors can include an adaptive algorithm to transmit data. The algorithm can reduce the transmission of data based on an event and/or otherwise reduce the data transmission frequency to extend battery life to more than 5 year, more than 10 years, or more than 15 years. The sensors may also include a low power wireless transmitter that has transmission frequency of sub-1 GHz and effective transfer distance of more than 100 meters, more than 150 meters, more than 200 meters and up to 250 meters. The temperature and humidity sensor can include a long lasting lithium battery as a power source. Preferably, this battery has a shelf life of at least 15 years or more than 20 years.

It has small size preferably having a size of less than 80 mm long by 80 mm wide by 20 mm thick, and less than 90 grams. Preferably, the sensor is easy to install. In some embodiments, the sensor includes a magnet to allow for quick attachment to metal surfaces.

The present invention aims to solve these problems by develop a small size, battery-powered, long life, long distance wireless temperature and humidity sensor module.

In some embodiments, a battery-powered wireless sensor module for measuring air temperature and relative humidity, and wirelessly transmitting the data to a sensor controller, includes a plastic shell holding components of the sensor module, an airflow grill for allowing air flow into the sensor module, a circuit board within the shell, one or more lithium batteries, a wireless module with a transmission frequency of less than 1 GHz, with a transmission distance of more than 100 meters, a microcontroller unit processor, for executing an adaptive algorithm for controlling transmission of data from the wireless sensor module, a temperature and humidity sensor, for sensing air temperature and relative humidity and sending data to the processor, a power management circuit, for measuring the battery voltage and shutting down the power when it is lower than a threshold voltage, and a memory comprising an adaptive algorithm for controlling the transmission of data from the wireless sensor module based on changes in the temperature or relative humidity.

In some embodiments, the battery-powered wireless sensor module has a battery life of more than 10 years during use. In some embodiments, the battery-powered wireless sensor module comprises two AA lithium ion batteries.

In some embodiments, the battery-powered wireless sensor module is than 100 mm in any one dimension. In some embodiments, the sensor module is than 80 mm in any one dimension. In some embodiments, the sensor module has a thickness of less than 20 mm. In some embodiments, the sensor module comprises a magnet to attach the sensor to a metal surface.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DETAILED DESCRIPTION OF THE INVENTION

The present invention is directed to battery-powered wireless temperature and humidity sensors. The sensors have a long life and long transmission distance. The sensors can include an adaptive algorithm to transmit data on an event bases and/or otherwise reduce the data transmission frequency to extend battery life to more than 5 years, more than 10 years, or more than 15 years. The sensors may include a low power wireless transmitter that has a frequency of sub-1 GHz and effective transfer distance of up to 250 meters.

Figure 1:
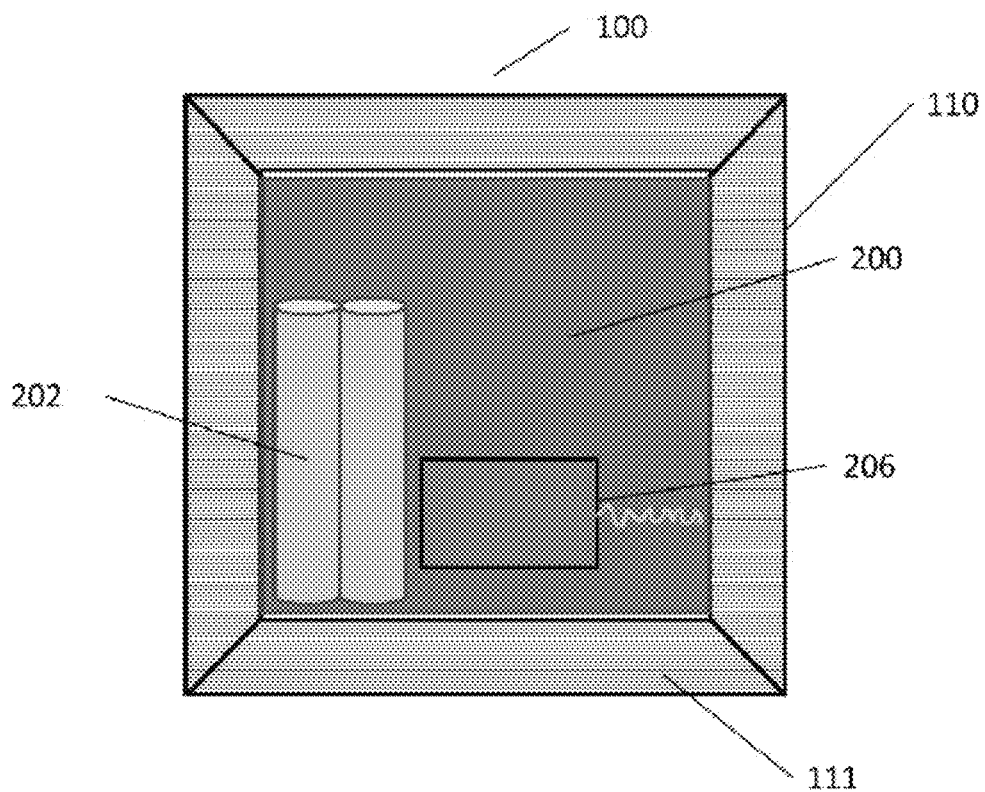
FIG. 1 is a perspective view of a battery-powered wireless long life temperature and humidity sensor module.

FIG. 1 is a perspective view of a battery-powered wireless long life temperature and humidity sensor module 100. The module include a shell 110, one or more airflow grill 111, a print circuit board 200, a battery pack 202, a processor 204, a wireless module with antenna 206, a temperature and humidity sensor 208 and a power management circuit 212.

The shell 110 may, for example, be two plastic pieces, for holding all the components of the sensor module. It may have a size of about 67 mm×67 mm×26 mm. Preferably, the sensor module 100 is less than 100 mm in any one dimension, preferably, less than 80 mm, preferably less 70 mm. Preferably, the sensor module has a thickness of less than 50 mm, less than 30 mm, or less than 20 mm.

The airflow grill 111 is comprised of a group of openings integrated with the shell 110 for allowing air flow into the sensor module so the temperature and humidity can be measured responsively and accurately, and removing heat generated by the sensor module. This grill may be rigidly molded as part of shell 110.

Figure 2:
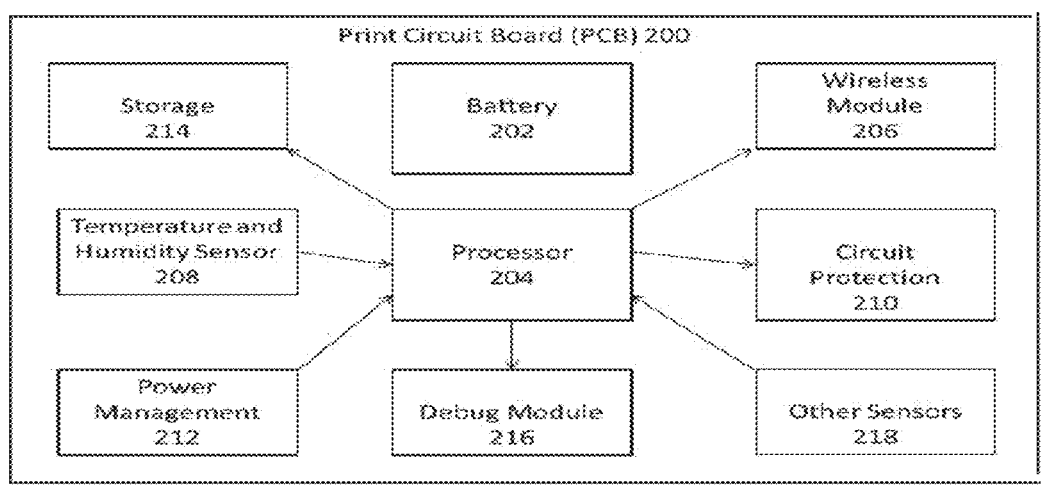
FIG. 2 is a detail view of a block diagram the print circuit board.

A detail view of a block diagram the print circuit board 200 is shown in FIG. 2. The printed circuit board 200 may connect all the electronic components of the sensor module together and may be rigidly screwed to said shell 110.

The printed circuit board can include a battery 202. An example of the battery is a lithium ion battery such as Energizer L91. The battery pack 202 is a solid package of two AA lithium battery, with shelf life of 20 years, for providing power for the sensor module, rigidly welded to said print circuit board 200.

The printed circuit board can include one or more processors 204. The processor 204 is a microcontroller unit, for processing all the input and output requests and executing the adaptive algorithm to transmit data with minimum energy, rigidly welded to said print circuit board 200. An example of the processor 204 is a low power microcontroller such as a TI MSP430 series processor.

The circuit board 200 also includes a wireless module 206. The wireless module 206 may have an antenna, with frequency of sub-1 GHz, and with a transmission distance of up to 250 meters in open space, for transmitting the data to the sensor controller. Examples of wireless module 206 are high performance wireless modules such as Anaren Integrated Radio (AIR) A1101R04C with Antenna 66089-0406 and AIR A110LR09C with Antenna 66089-8906. The wireless module 206 may be rigidly welded to said print circuit board 200.

The temperature and humidity sensor 208 is a high accuracy, low power use sensor for sensing air temperature and relative humidity, and sending data to the processor 204, rigidly welded to said print circuit board 200. The temperature and humidity sensor 208 consists of a negative temperature coefficient (NTC) thermistor used for measuring temperature and a polymer dielectric capacitive sensor element used for measuring relative humidity. It includes a mixed signal application-specific integrated circuit (ASIC) to provide the measurement information through digital serial interfaces. Examples of temperature and humidity sensor 208 are low power digital temperature and humidity sensors such as ST HTS221 and TI HDC1000 sensors. The sensor preferably uses less than 2 micro ample (µA) in data acquisition mode and less than 0.5 µA in sleep or power-down mode to save energy.

The power management circuit 212 measures the battery voltage and shuts down the power when it is lower than 2.4 V. This circuit can be rigidly welded to the print circuit board 200.

The circuit board 200 also includes a storage device 214, such as an electrically erasable programmable read-only memory (EEPROM), and/or a non-volatile memory such as a flash memory device.

The circuit board 200 also includes a debug module 216. The debug module can a Joint Test Action Group (JTAG) connector used for writing firmware, verifying designs and testing printed circuit boards after manufacture.

The circuit board 200 may also include other sensors in addition to the temperature and humidity sensors. Examples of these sensors include air pressure sensors, carbon dioxide sensors, particulate matter sensors and light level sensors.

Figure 3:
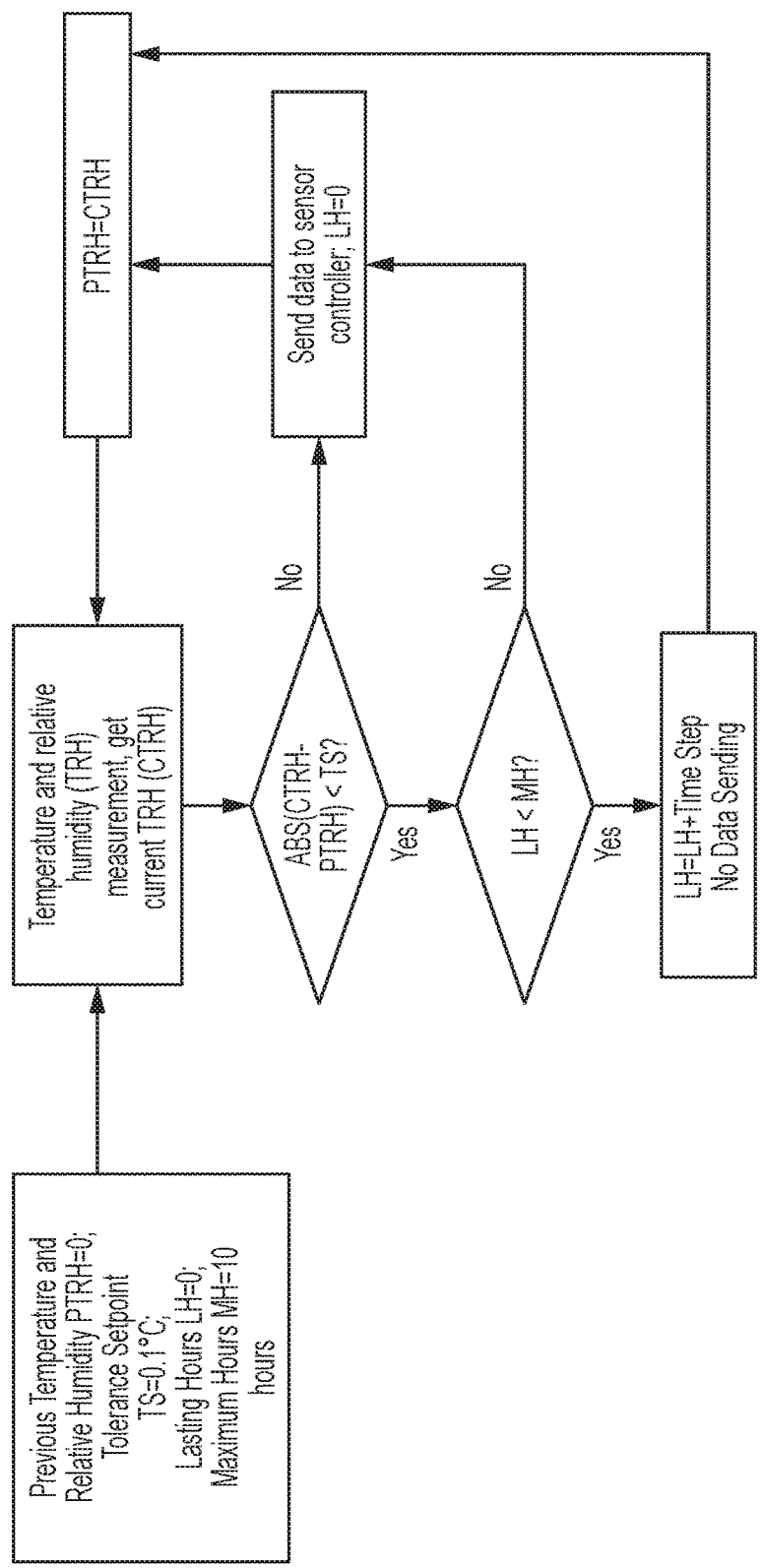
FIG. 3 is a detail view of a work flow of the adaptive algorithm.

A detail view of a process including the use of the adaptive algorithm is shown in FIG. 3. As shown in FIG. 3, the previous temperature (PT) and previous relative humidity (PRH) measurements are set to 0 initially. The Temperature Tolerance Setpoint (TTS) is adjustable and typically set to 0.5° C. The Relative Humidity Tolerance (RHTS) Setpoint is adjustable and typically set to 5%. Lasting Hours (LH), which is the amount of time since the last data transmission is set to 0 initially. The Maximum Hours, MH, is adjustable and typically set to 2 hours. MH is the maximum amount of time since the last time data has been sent. The MH can also be a random number between 2 minutes and 24 hours.

The current temperature (CT) and current relative humidity (CRH) are then measured. It is then determined whether the absolute values of subtracting the previous temperature from the current temperature and subtracting the previous relative humidity from the current relative humidity are less than their set points individually. If either one is No, data is sent to the sensor controller and the previous temperature and relative humidity are set to the current temperature and relative humidity. If the absolute values of the current temperature and relative humidity are both less than their individual set points, it is then determined whether the Lasting Hours (LH) is less than the Maximum Hours (MH). If LH<MH, no data is sent and LH is increased by the time step value. If LH≥MH data is sent to the sensor controller and LH is set to 0. For each time step, the previous temperature and relative humidity are set to the current temperature and relative humidity.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A battery-powered wireless sensor module for measuring air temperature and relative humidity, and wirelessly transmitting data to a sensor controller, comprising:
   a plastic shell holding components of the wireless sensor module;
   an airflow grill for allowing air flow into the wireless sensor module;
   a circuit board within the shell;
   one or more lithium batteries;

a wireless module with a transmission frequency of less than 1 GHz, with a transmission distance of more than 100 meters;

a microcontroller unit processor, for executing an adaptive algorithm for controlling transmission of data from the wireless sensor module;

a temperature and humidity sensor, for sensing air temperature and relative humidity and sending the data to the microcontroller unit processor;

a power management circuit, for measuring the battery voltage and shutting down the power when it is lower than a threshold voltage; and a memory comprising an adaptive algorithm for controlling the transmission of data from the wireless sensor module based on changes in the temperature or relative humidity, wherein the adaptive algorithm is configured to be executable by the microcontroller unit processor to cause the wireless sensor module to:

measure a current temperature and a current relative humidity;

determine whether an absolute value of a difference between a previous temperature and the current temperate is greater than a temperature set point;

determine whether an absolute value of a difference between a previous relative humidity and the current relative humidity is greater than a humidity set point;

if the absolute value of the difference between the previous temperature and the current temperate is greater than the temperature set point or if the absolute value of the difference between the previous relative humidity and the current relative humidity is greater than the humidity set point, transmit the data from the wireless sensor module; and if the absolute value of the difference between the previous temperature and the current temperate is less than the temperature set point and if the absolute value of the difference between the previous relative humidity and the current relative humidity is less than the humidity set point, transmit the data from the wireless sensor module if a time since a last transmission of the data is greater than a maximum value.

2. The battery-powered wireless sensor module of claim 1, wherein the wirelesssensor module has a battery life of more than 10 years during use.

3. The battery-powered wireless sensor module of claim 1, wherein the wireless sensor module comprises two AA lithium ion batteries.

4. The battery-powered wireless sensor module of claim 1, wherein the wireless sensor module is less than 100 mm in any one dimension.

5. The battery-powered wireless sensor module of claim 1, wherein the wireless sensor module is less than 80 mm in any one dimension.

6. The battery-powered wireless sensor module of claim 1, wherein the wireless sensor module has a thickness of less than 20 mm.

7. The battery-powered wireless sensor module of claim 1, wherein the wireless sensor module comprises a magnet to attach the wireless sensor module to a metal surface.

* * * * *